US012725459B2

(12) United States Patent
Huynh et al.

(10) Patent No.: US 12,725,459 B2
(45) Date of Patent: Sep. 1, 2026

(54) SMART OBD SCANNER WITH AUTOMATED DTC PRIORITIZATION AND RESOLUTION

(71) Applicant: INNOVA ELECTRONICS CORPORATION, Irvine, CA (US)

(72) Inventors: Thuan Cong Huynh, Ho Chi Minh City (VN); Phuong Pham, Fountain Valley, CA (US); Keith Andreasen, Garden Grove, CA (US); Hien Thu Pham, Hai Duong (VN)

(73) Assignee: INNOVA ELECTRONICS CORPORATION, Irvine, CA (US)

( * ) Notice: Subject to any disclaimer, the term of this patent is extended or adjusted under 35 U.S.C. 154(b) by 0 days.

(21) Appl. No.: 19/038,438

(22) Filed: Jan. 27, 2025

(65) Prior Publication Data

US 2026/0220975 A1 Jul. 30, 2026

(51) Int. Cl.
*G07C 5/00* (2006.01)
*G07C 5/08* (2006.01)

(52) U.S. Cl.
CPC ............. *G07C 5/006* (2013.01); *G07C 5/008* (2013.01); *G07C 5/0808* (2013.01); *G07C 5/0825* (2013.01); *G07C 2205/02* (2013.01)

(58) Field of Classification Search
CPC ...... G07C 5/006; G07C 5/008; G07C 5/0808; G07C 5/0825; G07C 2205/02
See application file for complete search history.

(56) References Cited

U.S. PATENT DOCUMENTS

| | | | | |
|---|---|---|---|---|
| 6,807,469 | B2 | 10/2004 | Funkhouser et al. | |
| 6,925,368 | B2 | 8/2005 | Funkhouser et al. | |
| 7,610,146 | B2 * | 10/2009 | Breed ..................... | G01W 1/00 701/300 |
| 7,620,484 | B1 | 11/2009 | Chen | |
| 8,019,503 | B2 | 9/2011 | Andreasen et al. | |
| 8,370,018 | B2 | 2/2013 | Andreasen et al. | |
| 8,909,416 | B2 | 12/2014 | Chen et al. | |
| 9,026,400 | B2 | 5/2015 | Chen et al. | |
| 9,177,428 | B2 | 11/2015 | Nguyen et al. | |

(Continued)

*Primary Examiner* — Tung S Lau
(74) *Attorney, Agent, or Firm* — Stetina Garred Brucker & Newboles

(57) ABSTRACT

A vehicle on-board diagnostics tester provides a listing of fixes for multiple, concurrent vehicle issues in a prioritized order to address critical needs first and avoid missed problems or creation of new problems. The tester reads Diagnostic Trouble Codes (DTCs) from a vehicle on-board diagnostic port when the vehicle malfunction indicator lamp is illuminated. A received DTC is checked to determine if it is currently in a pending and confirmed state, and if there are other pending and confirmed DTCs. No action is completed of the received DTC is inactive and there are no other active and confirmed DTCs. If the received DTC is active and there no other active and confirmed DTCs, a fix is displayed to a user associated with the received DTC. If there are multiple confirmed and active DTCs, fixes are generated to the user such that more critical DTC fixes are provided first, and less critical DTCs are provided earlier. Each DTC is associated with a priority group, and fixes for all DTCs in a priority group are provided before providing fixes for all DTCs in a next lower level priority group.

25 Claims, 8 Drawing Sheets

(56) References Cited

U.S. PATENT DOCUMENTS

| | | | | |
|---|---|---|---|---|
| 9,646,432 | B2 | 5/2017 | Madison et al. | |
| 10,643,403 | B2 | 5/2020 | Madison et al. | |
| 11,068,560 | B2 | 7/2021 | Chen et al. | |
| 11,158,141 | B2 | 10/2021 | Chen et al. | |
| 11,270,529 | B2 | 3/2022 | Chen et al. | |
| 11,625,962 | B2 | 4/2023 | Brunda et al. | |
| 11,915,534 | B1 | 2/2024 | Pham et al. | |
| 12,112,587 | B1 | 10/2024 | Huynh et al. | |
| 2017/0098200 | A1 * | 4/2017 | Merg | G06F 3/04817 |
| 2023/0222854 | A1 * | 7/2023 | Rich | G07C 5/0825 701/29.6 |

* cited by examiner

| DTC Code | Description | Priority Level |
|---|---|---|
| P0600 | Control Module Communication Bus 'A' Malfunction | 1 |
| P0601 | Internal Control Module Memory Check Sum Error | 1 |
| P0602 | Control Module Programming Error | 1 |
| P0603 | Internal Control Module Keep Alive Memory (KAM) Error | 1 |
| P0604 | Internal Control Module Random Access Memory (RAM) Error | 1 |
| P0340 | Camshaft Position Sensor Circuit Malfunction | 1 |
| P0335 | Crankshaft Position Sensor Circuit Malfunction | 1 |
| P0505 | Idle Control System Malfunction | 1 |
| P0506 | Idle Control System RPM Lower Than Expected | 1 |
| P0217 | Engine Overheat Condition | 1 |
| P0300 | Random/Multiple Cylinder Misfire Detected | 2 |
| P0301 | Cylinder 1 Misfire Detected | 2 |
| P0200 | Injector Circuit Malfunction | 2 |
| P0299 | Turbocharger/Supercharger 'A' Underboost Condition | 2 |
| P0730 | Incorrect Gear Ratio | 2 |
| P0420 | Catalyst System Efficiency Below Threshold (Bank 1) | 2 |
| P0430 | Catalyst System Efficiency Below Threshold (Bank 2) | 2 |
| P0400 | Exhaust Gas Recirculation Flow Malfunction | 2 |
| P0440 | Evaporative Emission Control System Malfunction | 2 |
| P0456 | Evaporative Emission System Leak Detected (very small leak) | 2 |
| P0130 | Oxygen Sensor Circuit (Bank 1, Sensor 1) | 3 |
| P0150 | Oxygen Sensor Circuit (Bank 2, Sensor 1) | 3 |
| P0128 | Coolant Temperature Below Thermostat Regulating Temperature | 3 |
| P0700 | Transmission Control System Malfunction | 3 |
| P0620 | Generator Control Circuit Malfunction | 3 |
| B1404 | Mirror Position Sensor Circuit Malfunction | 3 |
| B1231 | Air Bag Diagnostic Monitor Ground Circuit Failure | 3 |
| C1445 | Dynamic Stability Control Valve Supply Circuit Failure | 3 |
| U0100 | Lost Communication with ECM/PCM 'A' | 3 |
| B1100 | Door Ajar Warning Lamp Circuit Short to Battery | 3 |

FIG. 5

| DTC Code | Description | Priority Level |
|---|---|---|
| P0600 | Control Module Communication Bus 'A' Malfunction | 1 |
| P0601 | Internal Control Module Memory Check Sum Error | 1 |
| P0602 | Control Module Programming Error | 1 |
| P0603 | Internal Control Module Keep Alive Memory (KAM) Error | 1 |
| P0604 | Internal Control Module Random Access Memory (RAM) Error | 1 |
| P0340 | Camshaft Position Sensor Circuit Malfunction | 2 |
| P0335 | Crankshaft Position Sensor Circuit Malfunction | 2 |
| P0505 | Idle Control System Malfunction | 2 |
| P0506 | Idle Control System RPM Lower Than Expected | 2 |
| P0217 | Engine Overheat Condition | 2 |
| P0300 | Random/Multiple Cylinder Misfire Detected | 3 |
| P0301 | Cylinder 1 Misfire Detected | 3 |
| P0200 | Injector Circuit Malfunction | 3 |
| P0299 | Turbocharger/Supercharger 'A' Underboost Condition | 3 |
| P0730 | Incorrect Gear Ratio | 3 |
| P0420 | Catalyst System Efficiency Below Threshold (Bank 1) | 4 |
| P0430 | Catalyst System Efficiency Below Threshold (Bank 2) | 4 |
| P0400 | Exhaust Gas Recirculation Flow Malfunction | 4 |
| P0440 | Evaporative Emission Control System Malfunction | 4 |
| P0456 | Evaporative Emission System Leak Detected (very small leak) | 4 |
| P0130 | Oxygen Sensor Circuit (Bank 1, Sensor 1) | 5 |
| P0150 | Oxygen Sensor Circuit (Bank 2, Sensor 1) | 5 |
| P0128 | Coolant Temperature Below Thermostat Regulating Temperature | 5 |
| P0700 | Transmission Control System Malfunction | 5 |
| P0620 | Generator Control Circuit Malfunction | 5 |
| B1404 | Mirror Position Sensor Circuit Malfunction | 6 |
| B1231 | Air Bag Diagnostic Monitor Ground Circuit Failure | 6 |
| C1445 | Dynamic Stability Control Valve Supply Circuit Failure | 6 |
| U0100 | Lost Communication with ECM/PCM 'A' | 6 |
| B1100 | Door Ajar Warning Lamp Circuit Short to Battery | 6 |

FIG. 6

SMART OBD SCANNER WITH AUTOMATED DTC PRIORITIZATION AND RESOLUTION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to vehicle diagnostic testing and repair. The disclosure relates more particularly to systems for detecting and addressing concurrent vehicle conditions which require remediation.

2. Description of the Related Art

Diagnostic Trouble Codes (DTCs) and Malfunction Indicator Lamp (MIL) warnings reflect the automotive industry's efforts to improve vehicle diagnostics, emissions control, and overall vehicle reliability. In the 1960s and 1970s, vehicle diagnostics were primarily manual, relying on mechanical tools and visual inspections. There was little standardization, and diagnostics varied greatly between manufacturers. Basic diagnostic systems were introduced to monitor fundamental engine functions, but these systems were limited in scope and capability.

The first significant step towards modern diagnostics came in the early 1980s with the introduction of On-Board Diagnostics (OBD1). The California Air Resources Board (CARB) mandated that all vehicles sold in California starting in 1988 had to include a basic OBD system to monitor emissions control systems. OBD1 provided a way to detect and store faults in emissions-related components, but it lacked standardization across different manufacturers. Each manufacturer had its own set of codes and diagnostic tools, making it difficult for mechanics to diagnose issues across various vehicle brands.

The limitations of OBD1 and increasing environmental concerns led to the development of the more advanced OBD2 system. In 1996, the United States federal government mandated that all cars and light trucks sold in the US must be equipped with OBD2. OBD2 standardized the diagnostic trouble codes (DTCs), connectors, and communication protocols across all manufacturers. This system provided a common set of codes and a standardized data port, the OBD2 port, referred to as a Data Link Connector (DLC), for connecting diagnostic tools. OBD2 significantly expanded the scope of diagnostics beyond emissions control to include engine performance, transmission, and other critical systems. The OBD2 port, typically located under the dashboard, allowed mechanics and vehicle owners to use OBD2 scanners to retrieve DTCs and monitor real-time data. Connection to the DLC is via a data plug, known as the Diagnostic Connector (DC).

As automotive technology advanced, so did the standards for OBD systems. The Society of Automotive Engineers (SAE) and the International Organization for Standardization (ISO) played crucial roles in developing and updating these standards. Key developments include SAE J1979, which defines the diagnostic test modes used in OBD2 systems, ensuring consistency in how data is retrieved and interpreted. ISO 9141-2 and ISO 14230 (KWP2000) specify the communication protocols used by OBD2 systems. ISO 15765-4 (CAN), introduced in the early 2000s, became the preferred communication standard for OBD2 systems, offering faster data transfer rates and more robust diagnostics.

Modem OBD systems continue to evolve, incorporating advancements in vehicle technology and connectivity. Some key trends and developments include enhanced diagnostics that offer more detailed data and proprietary codes specific to each manufacturer, telematics systems that can transmit diagnostic data to remote servers for real-time monitoring and predictive maintenance, and ongoing efforts to harmonize OBD standards globally to ensure consistency across different markets and regions.

The evolution of DTCs and MIL warnings has had a profound impact on vehicle maintenance and repair. Standardized diagnostics have made it easier for mechanics to diagnose and fix issues accurately and efficiently. Vehicle owners can also use consumer-grade OBD2 scanners to monitor their vehicle's health and address issues proactively. Enhanced diagnostics and connectivity have further improved the ability to diagnose complex problems and perform remote diagnostics.

The history of DTCs and MIL warnings reflects the automotive industry's response to increasing demands for better diagnostics, emissions control, and vehicle reliability. From the early, non-standardized systems of the 1960s and 1970s to the standardized OBD2 system introduced in the 1990s, and the advanced diagnostics and connectivity of modem vehicles, the evolution of these systems has significantly improved the ability to monitor, diagnose, and maintain vehicles.

Today, DTCs play a critical role in vehicle maintenance and repair for both consumers and professionals. They provide valuable information for diagnosing and fixing issues, ensuring vehicles operate efficiently and safely.

OBD scanners evolved along with the evolution of DTC codes. Early OBD1 scanners were simple devices capable of reading basic diagnostic codes. These scanners often used proprietary connectors and communication protocols specific to each manufacturer, which made the diagnostic process less standardized and more complex. Mechanics typically retrieved DTCs using these scanners or by interpreting a sequence of flashes from the "Check Engine" light, each sequence corresponding to specific error codes.

A significant change came in 1996 when OBD2 became mandatory for all cars sold in the United States. Enhanced OBD2 scanners could read a broader range of DTCs, covering various systems such as the engine, transmission, and emissions. These scanners also introduced the ability to stream real-time data on various parameters like engine RPM, vehicle speed, and fuel trim, providing a more comprehensive diagnostic capability.

The 2000s saw the advent of handheld OBD2 scanners, which became more sophisticated with features like color screens, graphing capabilities, and comprehensive diagnostic functions. Some advanced scanners also offered bidirectional control, allowing mechanics to send commands to the vehicle's control modules for functions like actuator tests and system reinitializations. Additionally, Bluetooth and Wi-Fi enabled OBD2 scanners emerged, facilitating connections to smartphones, tablets, and laptops. These wireless scanners worked with dedicated apps to provide detailed diagnostics and vehicle information, enhancing the ease and efficiency of the diagnostic process.

In the 2010s, professional-grade diagnostic tools emerged, offering dealership-level diagnostic capabilities and accessing manufacturer-specific codes. These tools performed advanced functions such as module coding and programming. All-in-one diagnostic systems were developed, combining multiple diagnostic tools into a single device capable of diagnosing a wide range of vehicles and systems. Cloud-based diagnostic services also became integrated into some advanced tools, enabling remote diagnostics and software updates.

OBD2 scanners are currently available in various forms, from basic handheld units to advanced smartphone apps that connect via Bluetooth. When a MIL or check engine light illuminates on the dashboard, it signals that a DTC has been stored in the vehicle's computer. One can use the scanner to retrieve these codes. The scanner displays the codes, which are typically alphanumeric (e.g., P0301 for a cylinder misfire).

With the DTC information, consumers can perform basic troubleshooting. For example, a code indicating a loose gas cap (P0455) can be resolved by tightening or replacing the gas cap. For more complex issues, the codes provide a starting point for further investigation or professional diagnosis. Some consumers use DTCs to perform their own vehicle maintenance and repairs. Armed with the code information and online resources, such as repair manuals and video tutorials, they can address issues themselves, saving on repair costs. However, for more complicated problems, they might still seek professional help. Regularly checking for DTCs, even when the MIL is not illuminated, allows consumers to catch potential issues early. This proactive approach can prevent minor problems from becoming major, expensive repairs.

Professionals use advanced diagnostic tools that not only read DTCs but also provide comprehensive data on vehicle performance. These tools can access manufacturer-specific codes and data, offering deeper insights into the vehicle's health. When a vehicle arrives at a repair shop with an illuminated MIL, the technician starts by scanning for DTCs. The codes provide a direction for troubleshooting, helping the technician quickly identify and isolate the problem. This efficiency reduces diagnostic time and improves repair accuracy. Professionals analyze the DTCs in conjunction with freeze frame data, which captures the vehicle's operating conditions when the fault occurred. This information includes parameters like engine speed, vehicle speed, and temperature, offering a clearer picture of the problem's context.

Advanced diagnostic tools used by professionals can access manufacturer-specific codes and service bulletins. This access ensures that technicians have the most accurate and up-to-date information for diagnosing and repairing issues, particularly for complex or uncommon problems. Once the issue is diagnosed, professionals use the DTC information to guide the repair process. They follow established procedures and use the appropriate tools and parts to fix the problem. After repairs, they clear the codes and test the vehicle to ensure the issue is resolved. In addition to reactive repairs, professionals use DTCs for preventive and predictive maintenance. Regular diagnostic scans can identify issues before they trigger the MIL, allowing for timely maintenance that prevents breakdowns and extends the vehicle's lifespan. DTCs help professionals communicate effectively with customers. They can explain the nature of the issue, its potential impact, and the necessary repairs in a clear and understandable way. This transparency builds trust and ensures customers are informed about the work being done on their vehicle.

For consumers, DTCs provide a means to understand and address vehicle issues, perform basic maintenance, and take preventive measures. For professionals, DTCs are essential tools for efficient troubleshooting, detailed analysis, accurate repairs, and preventive maintenance. The use of DTCs by both groups ensures that vehicles remain reliable, efficient, and safe on the road.

A non-limiting example of a commercially available OBD2 scanner can be found in the INNOVA 5610 CarScan Pro scanner. The Innova 5610 CarScan Pro is an OBD2 diagnostic tool designed for both professional mechanics and advanced DIY users. It provides extensive diagnostic capabilities across all major vehicle systems, including the engine, transmission, anti-lock braking system (ABS), and supplemental restraint system (SRS). The tool can read and clear Diagnostic Trouble Codes (DTCs), access live data streams, and perform bidirectional control to test specific components actively. This allows users to verify the functionality of systems such as the ABS, ABS pump and fuel pump without needing to drive the vehicle.

The scanner supports various maintenance functions, including oil light resets, battery initialization, ABS brake bleeding, and electronic parking brake (EPB) service. It also integrates with the RepairSolutions2 app available from INNOVA, which offers detailed repair recommendations, parts information, and step-by-step instructions. The app, compatible with Android and iOS devices, provides verified solutions from ASE-certified technicians, enhancing the diagnostic process.

The RepairSolutions2 app works in tandem with the Innova 5610, providing users with comprehensive diagnostic and repair information. It analyzes the DTCs retrieved by the scanner, offering detailed explanations, potential causes, and verified repair solutions. The app also recommends specific parts and tools needed for the repairs, linking directly to retailers where users can purchase these items. Additionally, the app allows for real-time data monitoring, maintenance alerts, emissions check readiness, and the generation of vehicle health reports. This app enhances the diagnostic tool's functionality by providing detailed and actionable insights, ensuring accurate and efficient vehicle maintenance and repair.

BRIEF SUMMARY

In accordance with an example embodiment of the present disclosure, a system and method providing a smart OBD scanner with automated DTC prioritization and resolution incudes receiving DTC output from a vehicle OBD port. A determination is made as to whether a received DTC is in a confirmed state. A determination is also made as to whether there are any pending DTCs. If the received DTC is confirmed and there are no additional pending DTCs, a fix for the received DTC is displayed to a user.

In accordance with another example embodiment of the present disclosure, DTC codes are stored with an associated priority level. When it is determined that there are additional confirmed and pending DTCs, fixes are displayed to a user in an order from higher priority DTCs to lower priority DTCs.

In accordance with another example embodiment of the present disclosure, groups of DTCs share one of a plurality of priority levels, and fixes for pending DTCs are ordered with fixes for all DTCs in a highest priority level group being first, fixes for all DTCs in one or more intermediate priority level groups following; and ending with fixes for all DTCs in a lowest priority level group.

BRIEF DESCRIPTION OF THE DRAWINGS

These and other features and advantages of the various embodiments disclosed herein will be better understood with respect to the following description and drawings, in which:

FIG. 5 is illustrates a representative sampling of DTC codes along with priority levels of 1 through 3; and FIG. 6 is illustrates a representative sampling of DTC codes along with priority levels of 1 through 6.

DETAILED DESCRIPTION

Figure 1:
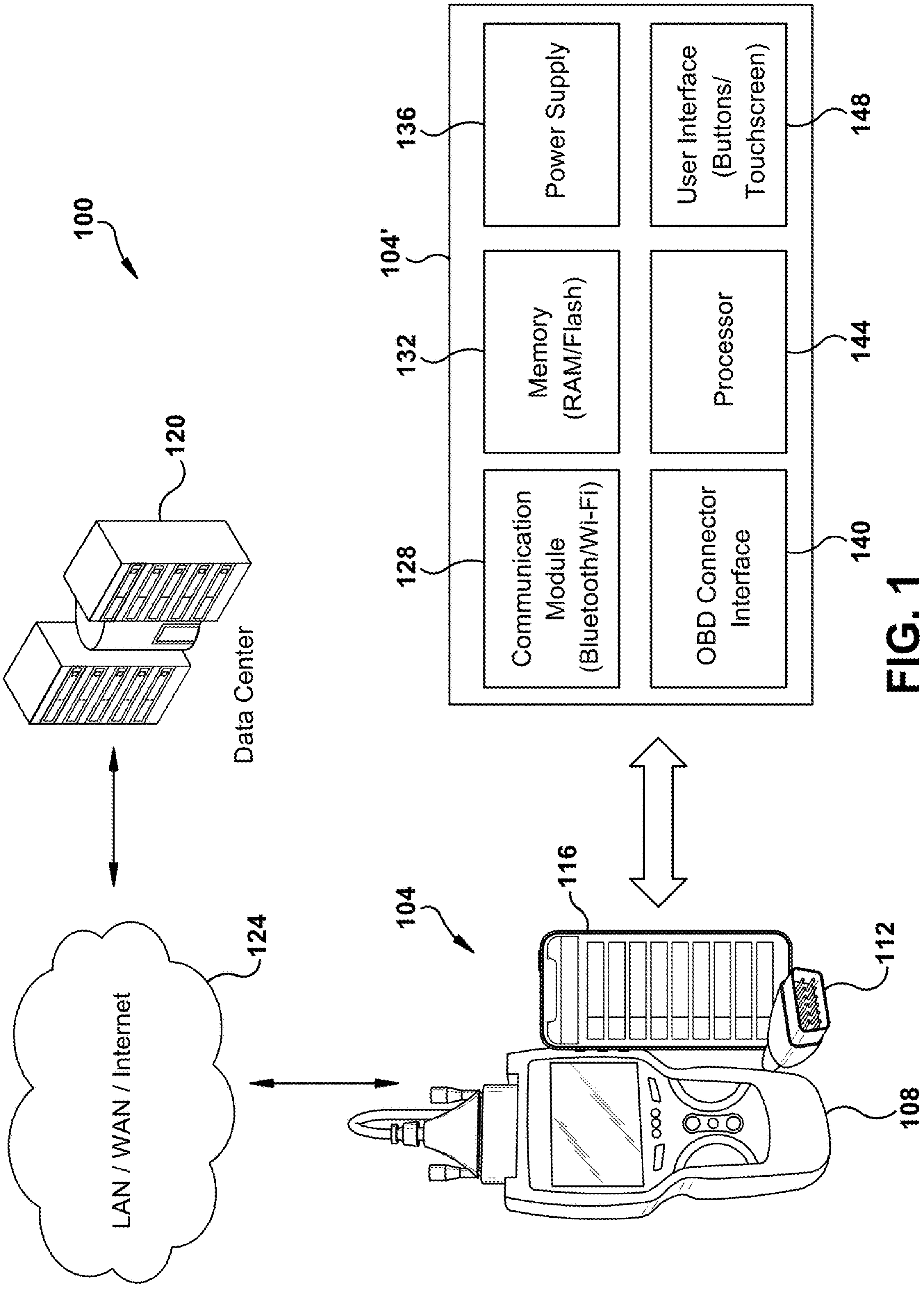
FIG. 1 illustrates an example embodiment of a system for a smart On-Board Diagnostics (OBD) scanner with automated Diagnost Trouble Code (DTC) prioritization and resolution.

The detailed description set forth below in connection with the appended drawings is intended as a description of certain embodiments of a vehicle diagnostic system and related method, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

While OBD scanners, such as the INNOVA 5610, provide valuable assistance in diagnosing and fixing automotive issues, there are situations when multiple vehicle issues are present. Technical issues that cause a MIL can occur concurrently. Addressing multiple MIL issues in the wrong order can lead to several problems, including misdiagnosis, wasted time and resources, and potentially worsening vehicle performance. Fixing a less critical issue first might not resolve the root cause, leading to the reappearance of MIL or new codes. This approach can also overlook the root causes, causing repeated diagnostics and repairs without effectively solving the underlying problem. Some systems in a vehicle are interdependent, and fixing an issue in one system without addressing a foundational problem in another system can result in temporary or ineffective repairs. Ignoring foundational issues like voltage or problems with the Engine Control Module (ECM), also commonly known as the Engine Control Unit (ECU) or Powertrain Control Module (PCM), can cause recurring issues even after other repairs are made.

Addressing non-critical issues first can waste time and money, especially if the more critical issues cause further damage. Misordering repairs can lead to additional diagnostic sessions, as the root issue might continue to trigger new codes. Ignoring critical issues such as misfires or transmission problems can lead to degraded vehicle performance, increased emissions, and potential safety hazards. Unresolved foundational issues like voltage problems can cause further damage to sensors, the ECM, and other components. Delaying repairs for safety-critical systems like brakes or airbag systems can increase the risk of accidents. Misfires and transmission issues can lead to unreliable vehicle operation, increasing the risk of breakdowns or accidents.

In example embodiments herein, DTC prioritization is accomplished by grouping DTC codes in hierarchical priority levels, listed in a sequence from highest priority to lowest priory. Choosing an optimal range of priority levels for DTCs can be application specific and involves balancing a need for detailed prioritization with the simplicity and usability of the system. With a 1-3 priority level range, the system is simple and easy to understand, facilitating quick decision-making due to fewer categories. However, it may not provide enough granularity for more complex systems, and important distinctions between different levels of severity might be lost.

A 1-5 priority level range offers a balanced level of granularity, providing more detailed categorization without being overly complex. This range is suitable for most vehicles and scenarios, offering a good middle ground between simplicity and detail. While slightly more complex than a 1-3 system, it ensures that distinctions between various levels of severity and urgency are more accurately represented. However, some issues that could benefit from further distinction might still be grouped together.

A 1-6 priority level range is highly granular, allowing for very specific prioritization. This range can distinguish subtle differences in severity and urgency, making it particularly useful for complex vehicles with many systems. Despite its advantages, this range is more complex and potentially harder to use. It could potentially lead to decision concerns if unsophisticated users find it difficult to differentiate between similar levels.

An optimal priority level range depends on the specific context in which the prioritization system is being used. For general use, a 1-5 priority level range is often optimal as it strikes a good balance between simplicity and detailed categorization. It provides enough granularity to differentiate between various levels of severity and urgency while remaining manageable and easy to understand for most users. For highly complex vehicles or systems with many interdependent components, a 1-6 range might be more suitable, allowing for very precise prioritization crucial for ensuring all issues are addressed appropriately. If simplicity and ease of use are paramount, especially in settings where quick decisions are necessary, a 1-3 range might be the best choice, being straightforward and still effectively prioritizing issues, though it might lack some detail.

Prioritized remediation of DTC codes is selected to address the most critical systems first. An example prioritized, six level ordering is listed below:

1. ECM-Related Codes:

These codes pertain to the Engine Control Module (ECM) or Powertrain Control Module (PCM), as problems with these can affect multiple systems in the vehicle.

Examples: ECM/PCM internal faults, communication errors, and power supply issues.

2. Safety-Related Codes:

Codes related to systems that directly impact the safety of the vehicle and its occupants, such as the Supplemental Restraint System (SRS), Anti-lock Braking System (ABS), and Electronic Stability Control (ESC).

Examples: Airbag system faults, brake system failures, and traction control issues.

3. Performance-Related Codes:

Codes affecting the overall performance and drivability of the vehicle, including engine and transmission issues.

Examples: Misfire codes, fuel system problems, ignition system faults, and transmission control issues.

4. Emissions-Related Codes:

Codes related to systems that impact the vehicle's emissions and are critical for compliance with environmental regulations.

Examples: Oxygen sensor faults, catalytic converter efficiency issues, Exhaust Gas Recirculation (EGR) problems, and evaporative emission control system leaks.

5. Diagnostic and Monitoring Codes:

Codes involving the vehicle's onboard diagnostic systems and sensor functionality.

Examples: Sensor circuit malfunctions, control module communication errors, and system readiness checks.

6. Convenience and Comfort Codes:

Codes pertaining to systems that enhance the comfort and convenience of the vehicle but do not necessarily impact safety or performance.

Examples: Climate control system faults, infotainment system issues, and power accessory malfunctions.

By way of example, if the order of addressing issues starts with fixing a small evaporative emission control system leak, it won't resolve performance issues or safety risks posed by misfires, transmission, or idle control problems. Ignoring a cylinder misfire can lead to further engine damage and increased emissions, despite fixing the evaporative leak and idle control. Transmission sensor issues, if delayed, can lead to unreliable vehicle operation, which can worsen over time and affect drivability. Example embodiments herein automatically prioritize fixing issues like cylinder misfires and transmission malfunctions first, followed by emissions compliance and drivability concerns, and finally addressing sensor accuracy and smaller emissions issues. This logical prioritization ensures that critical and foundational issues are resolved first, leading to more effective and efficient vehicle maintenance and repair.

Example embodiments herein offer a diagnostic solution by categorizing DTCs states as confirmed or pending. Fix logic resolves concurrent DTC using a logic to check for DTCs in confirmed and pending states, suitably in accordance with DTC categories, lowest number to the highest, etc.

It is to be noted that the vehicle's ECU initially stores a code as "pending" after a first trip with a failure. If a failure is detected on the subsequent trip, the ECU logs a DTC as "confirmed." Once confirmed, the MIL is set to ON. After several driving cycles, the test may pass, removing the "pending" DTC and result in an inactive confirmed code. When diagnosing and addressing an issue, active DTCs are prioritized as they require immediate attention. DTCs with a pending status provides factor in determining whether they are active or inactive, which as those skilled in the art will recognize, mitigates false positives associated with confirmed DTCs that do not correspond to a current vehicle issue.

Elements for diagnosing a vehicle fault include:

MIL ON.

A DTC in a confirmed and pending State.

Fix logic is applied if there are multiple DTCs.

ECM memory DTCs.

Give Fix for DTCs from the lowest number to the highest.

System and Ignition voltage DTCs.

Give Fix for DTCs from the lowest number to the highest.

Component/circuit DTCs (sensors, etc.).

Give Fix for DTCs from the lowest number to the highest.

System DTCs (misfire, fuel trim, etc.).

Give Fix for DTCs from the lowest number to the highest.

Referring to FIG. 1, illustrated is an example embodiment of a system 100 for a smart OBD scanner with automated DTC prioritization and resolution. Included is an OBD scanner system 104, suitably comprised of OBD scanner device 108 (e.g., a data acquisition and transfer device), illustrated as a handheld scanner. It is contemplated that the scanner device 108 may include, but is not limited to, a scan tool, code reader, or a diagnostic dongle. Scanner system 104 further includes diagnostic connector 112, configured to place scanner system 104 in data communication with a vehicle when plugged into its DLC port. The diagnostic connector 112 may be located at one end of a cable, while the other end of the cable is connectable to the scanner device 108. It is also contemplated that the diagnostic connector 112 may be integrated directly into the housing of the scanner device 108. Scanner system 104 may also include a secondary digital device, illustrated as smartphone 116, to work in tandem with scanner 108, such as by running an app, such as the RepairSolutions2 app described above.

Scanner system 104 is suitably in data communication with a remote data center 120. The data center, in conjunction with an OBD scanner, serves as a backend system that enhances the scanner's diagnostic capabilities. The data center 120 may include hardware (e.g., servers, computers, processors, memory circuits, etc.) and software that implement the diagnostic functionalities discussed herein. When an OBD scanner reads a vehicle's DTCs, it transmits this data to the data center, where analytics interpret the codes, correlate them with known issues, and generate detailed diagnostic reports. These reports may include root cause analysis and suggested remedies, which are then sent back to the mechanic or vehicle owner via a user-friendly interface, such as on the smartphone 116 or other digital display device used by the user. This real-time data exchange enables accurate, timely diagnostics and predictive maintenance, significantly improving vehicle repair efficiency and reliability. Use of a common data center allows devices access to continuously updated and refined data for diagnosis and repair. Data communication between scanner system 104 and data center 120 may be accomplished via network cloud 124, comprised of any wireless or wired data communications system which may include a local area network (LAN), a wide area network (WAN) which may comprise the Internet, or any combination thereof.

An example embodiment of a construction of a scanner system is illustrated by scanner system 104'. Included is a data communication module 128, suitably comprised of a wired data connector (DC) or a wireless data interface, such as Bluetooth or WiFi. Also included is data storage or memory 132, suitably comprised of volatile memory, such as RAM, and nonvolatile memory, such as ROM or disk data storage, or any suitable combination thereof. Also included is power supply 136, comprised of any suitable power source, wired or self-sustaining such as a battery, which may be rechargeable. OBD connector interface 140 provides for data exchange between a vehicle DLC via DC 112. Also included are one or more processors, such as processor 144. A user interface 148 suitably includes a user input and a display, suitably including input switch buttons or a touch-screen, or a combination thereof. Memory 132 includes software that provides automated DTC prioritization and resolution as illustrated in connection with FIG. 3, detailed below.

Figure 2:
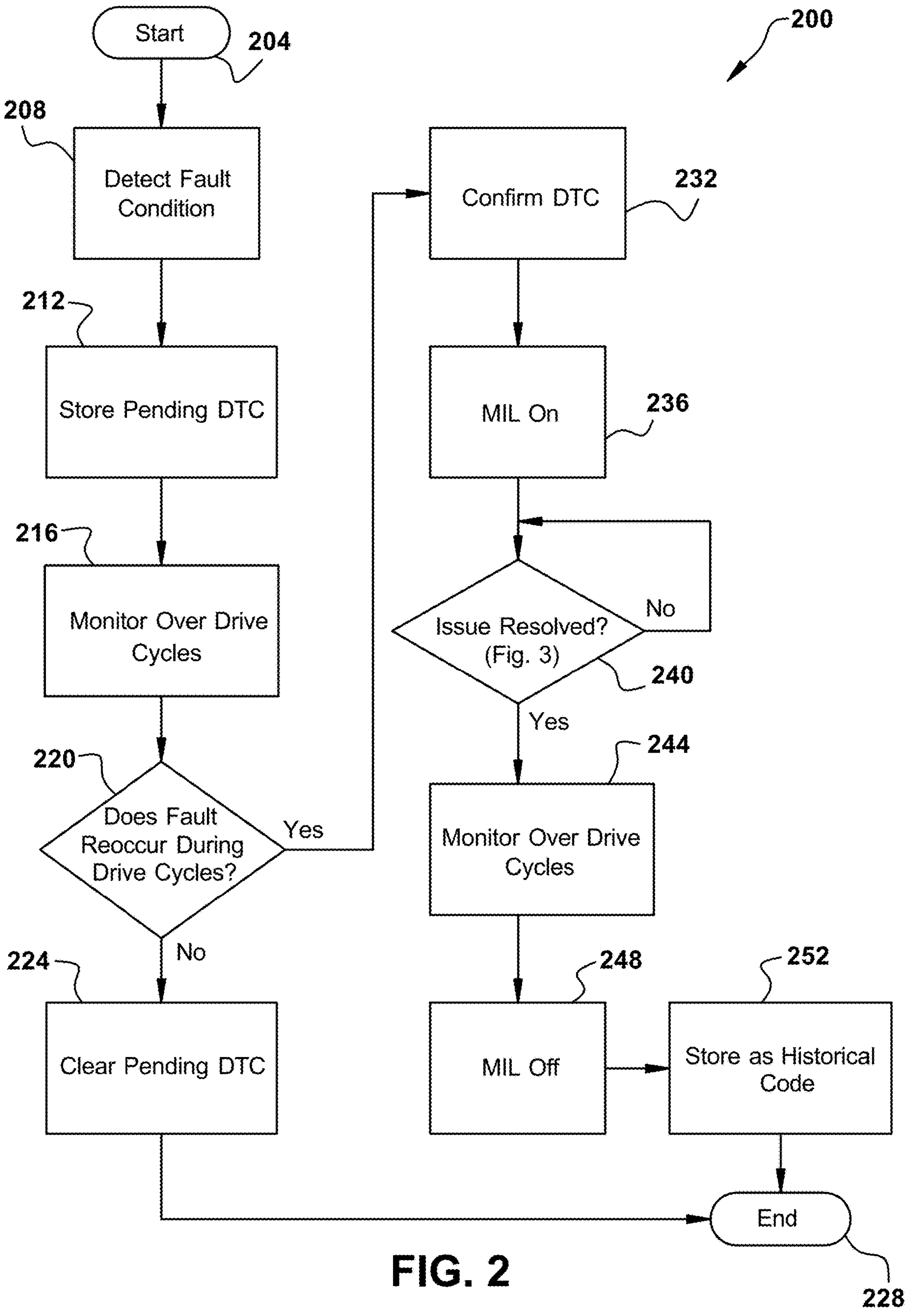
FIG. 2 is a flowchart of an example embodiment of a Diagnostic Fault Management (DFM) for a smart OBD scanner with automated DTC prioritization and resolution.

FIG. 2 illustrates a flowchart 200 of a Diagnostic Fault Management (DFM) for a smart OBD scanner with automated DTC prioritization and resolution. This operation is typically performed by the ECM. The ECM continuously monitors various sensors and systems in the vehicle, detects and stores fault codes, checks for recurrence, illuminates the MIL when necessary, and verifies the resolution of issues.

The DFM process commences at block 204 and proceeds to block 208 where a fault is detected. A DTC associated with a detected fault is stored as a pending DTC at block 212. Next, the pending DTC is monitored over a series of drive cycles at block 216. A drive cycle is a series of specific driving maneuvers and conditions designed to simulate typical vehicle operation and ensure the readiness of all onboard diagnostic systems. It may include various phases such as idling, acceleration, cruising at steady speeds, deceleration, and engine off periods. The purpose of a drive cycle is to allow the ECM to complete self-tests and confirm that the vehicle's emission control systems are functioning correctly.

Next, a test is made at block 220 to determine if the detected fault reoccurs during the drive cycles. If not, the pending DTC is cleared at block 224 and the process ends at block 228.

If it is determined at block 220 that the detected fault is recurrent, the DTC is confirmed at block 232 and the MIL is illuminated at block 236. The process then loops at block 240 until such time that the fault has been remedied as detailed by FIG. 3, below. When the fault has been remedied, the remediation is monitored for a series of drive cycles at block 244, and the MIL is then turned off at block 248. The event is then stored as an historical code at block 252 before the process ends at block 228.

Figure 3:
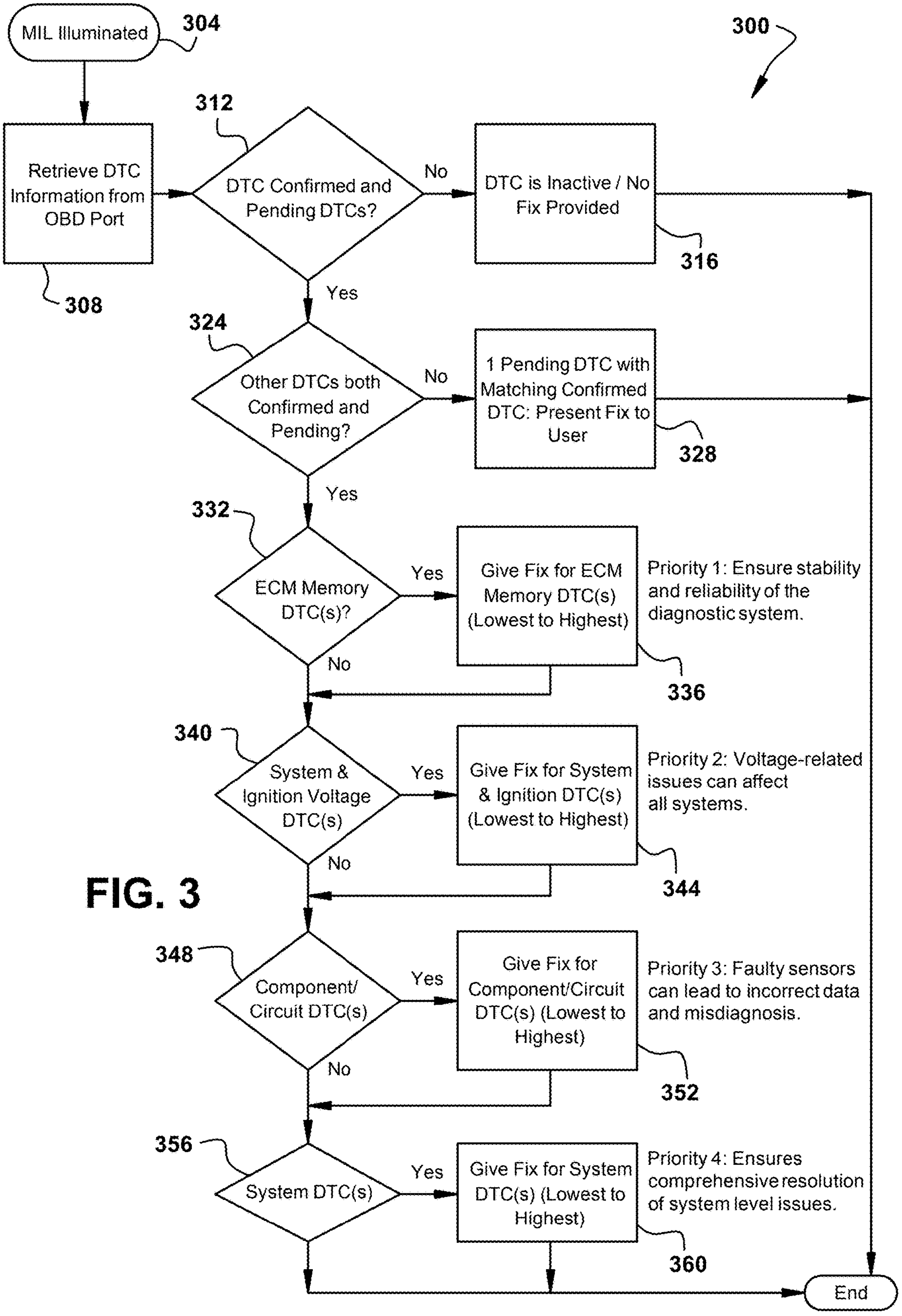
FIG. 3 is a flowchart for an example embodiment of a smart OBD scanner with automatic DTC prioritization and resolution that includes four priority levels.

FIG. 3 illustrates a flowchart 300 for an example embodiment of a smart OBD scanner with automatic DTC prioritization and resolution that includes four priority levels, with Priority 1 being the highest priority and Priority 4 being the lowest priority. Four levels provide an intermediate number that strikes a balance with both a relatively detailed prioritization along with simplicity and usability for users. An example prioritized, four level ordering is listed below:

1. Critical Priority Codes:
   These codes require immediate attention as they pose significant safety risks or can cause severe damage to the vehicle if not addressed promptly. These issues often affect the vehicle's core functionalities and critical safety systems.
   Examples: ECM/PCM internal faults, brake system failures, airbag system faults, and engine overheating.
2. High Priority Codes:
   These codes represent significant problems that affect the vehicle's performance, drivability, or emissions. While they do not pose immediate safety risks, they should be addressed soon to prevent further damage and ensure the vehicle operates efficiently and within regulatory compliance.
   Examples: Engine misfires, fuel system problems, oxygen sensor faults, and turbocharger underboost conditions.
3. Medium Priority Codes:
   These codes impact the vehicle's drivability, fuel efficiency, or minor safety systems. They do not pose immediate risks but should be addressed to avoid long-term damage or worsening conditions.
   Examples: Exhaust Gas Recirculation (EGR) problems, catalytic converter efficiency issues, and transmission control malfunctions.
4. Low Priority Codes:
   These codes are related to non-critical systems that primarily affect the convenience, comfort, or minor functionalities of the vehicle. While these issues do not significantly impact safety or performance, addressing them can improve the overall driving experience and prevent minor annoyances.
   Examples: Climate control system faults, infotainment system issues, door ajar warning light malfunctions, and minor sensor circuit faults.

The process of flowchart 300 suitably coincides with issue resolution block 240 of FIG. 2. The process commences at block 304 when a MIL is illuminated. DTC information is then obtained into a diagnostic testing system via an OBD port at block 308. If the DTC is determined to be unconfirmed at block 312 and if there are no other pending DTCs, the DTC is determined to be inactive, so no fix is applied at block 316 and the process ends at block 320. If the DTC is confirmed and other DTCs are pending, the process moves from block 312 to block 324 where a determination is made as to whether any other DTCs are both confirmed and pending. If not, the process moves to block 328 where a fix corresponding to the received, confirmed DTC is presented to a user prior to termination of the process at block 320.

If it is determined at block 324 that other DTCs are both confirmed and pending, a test is made for presence of DTCs associated with a first hierarchical priority level, a level to ensure stability and reliability of the ECM itself. If any Priority 1 DTCs exist as determined by block 332, fixes are supplied at block 336, suitably in numerical order from a lowest number to a highest number, assuring that all DTCs are addressed. Once all Priority 1 fixes have been supplied, the process moves to block 332.

An illustrative sampling of some DTC codes associated with the Priority 1 issues follows:

Priority 1: ECM Issues:

OBD2 Code Description

P0600 Serial Communication Link

P0601 Internal Control Module Memory Check Sum Error

P0602 Control Module Programming Error

P0603 Internal Control Module Keep Alive Memory (KAM) Error

P0604 Internal Control Module Random Access Memory (RAM) Error

P0605 Internal Control Module Read Only Memory (ROM) Error

P0606 ECM/PCM Processor Error

P0607 Control Module Performance

P0610 Control Module Vehicle Options Error

P0613 Transmission Control Module (TCM) Error

Next, a test is made at block 340 to determine if any Priority 2 DTCs are present. Priority 2 DTCs are voltage related and can thus affect all systems. If any priority 2 DTCs exist, fixes are supplied at block 344, suitably from a lowest number to a highest number. Once all Priority 2 fixes have been supplied, the process moves to block 348.

An illustrative sampling of some DTC codes associated with the Priority 2 issues follows:

Priority 2: Ignition and Voltage DTCs

OBD2 Code Description

P0320 Ignition/Distributor Engine Speed Input Circuit

P0321 Ignition/Distributor Engine Speed Input Circuit Range/Performance

P0322 Ignition/Distributor Engine Speed Input Circuit No Signal

P0323 Ignition/Distributor Engine Speed Input Circuit Intermittent

P0560 System Voltage

P0561 System Voltage Unstable

P0562 System Voltage Low

P0563 System Voltage High

P0620 Generator Control Circuit

P0621 Generator Lamp Control Circuit

A test is then made at block 348 to determine if any Priority 3 DTCs are present. Priority 3 DTCs relate to sensors. Faulty sensors can lead to incorrect data and misdiagnosis. If any Priority 3 DTCs exist, fixes are supplied at block 352, suitably from a lowest number to a highest number. Once all Priority 3 DTCs have been addressed, the process proceeds to block 356.

An illustrative sampling of some DTC codes associated with Priority 3 issues

Priority 3: Component or Circuit Issues:

OBD2 Code Description

P0100 Mass or Volume Air Flow Circuit Malfunction

P0101 Mass or Volume Air Flow Circuit Range/Performance

P0102 Mass or Volume Air Flow Circuit Low Input

P0103 Mass or Volume Air Flow Circuit High Input

P0105 Manifold Absolute Pressure/Barometric Pressure Circuit Malfunction

P0110 Intake Air Temperature Sensor Circuit Malfunction

P0115 Engine Coolant Temperature Sensor Circuit Malfunction

P0120 Throttle/Pedal Position Sensor/Switch "A" Circuit

P0130 02 Sensor Circuit (Bank 1 Sensor 1)

P0135 02 Sensor Heater Circuit Malfunction (Bank 1 Sensor 1)

System DTCs

A test is them made at block 356 to determine a presence of any other DTCs, such as DTCs addressed to any remaining system. These are assigned a lowest Priority 4. Fixes are supplied to address remaining DTCs at block 360, suitably in numerical order, and the process then ends at block 320.

It is contemplated that any step following the retrieving of the DTC information from the OBD port in block 308 may proceed autonomously in response to receipt of the DTC information. In other words, once the DTC information is received, the following steps may occur independent of any user input.

An illustrative sampling of Priority 4 DTCs follows:

Priority 4: System DTC issues:

OBD2 Code Description

P0170 Fuel Trim Malfunction (Bank 1)

P0171 System Too Lean (Bank 1)

P0172 System Too Rich (Bank 1)

P0173 Fuel Trim Malfunction (Bank 2)

P0174 System Too Lean (Bank 2)

P0175 System Too Rich (Bank 2)

P0180 Fuel Temperature Sensor A Circuit

P0190 Fuel Rail Pressure Sensor Circuit

P0200 Injector Circuit/Open

P0217 Engine Over-temperature Condition

Figure 4:
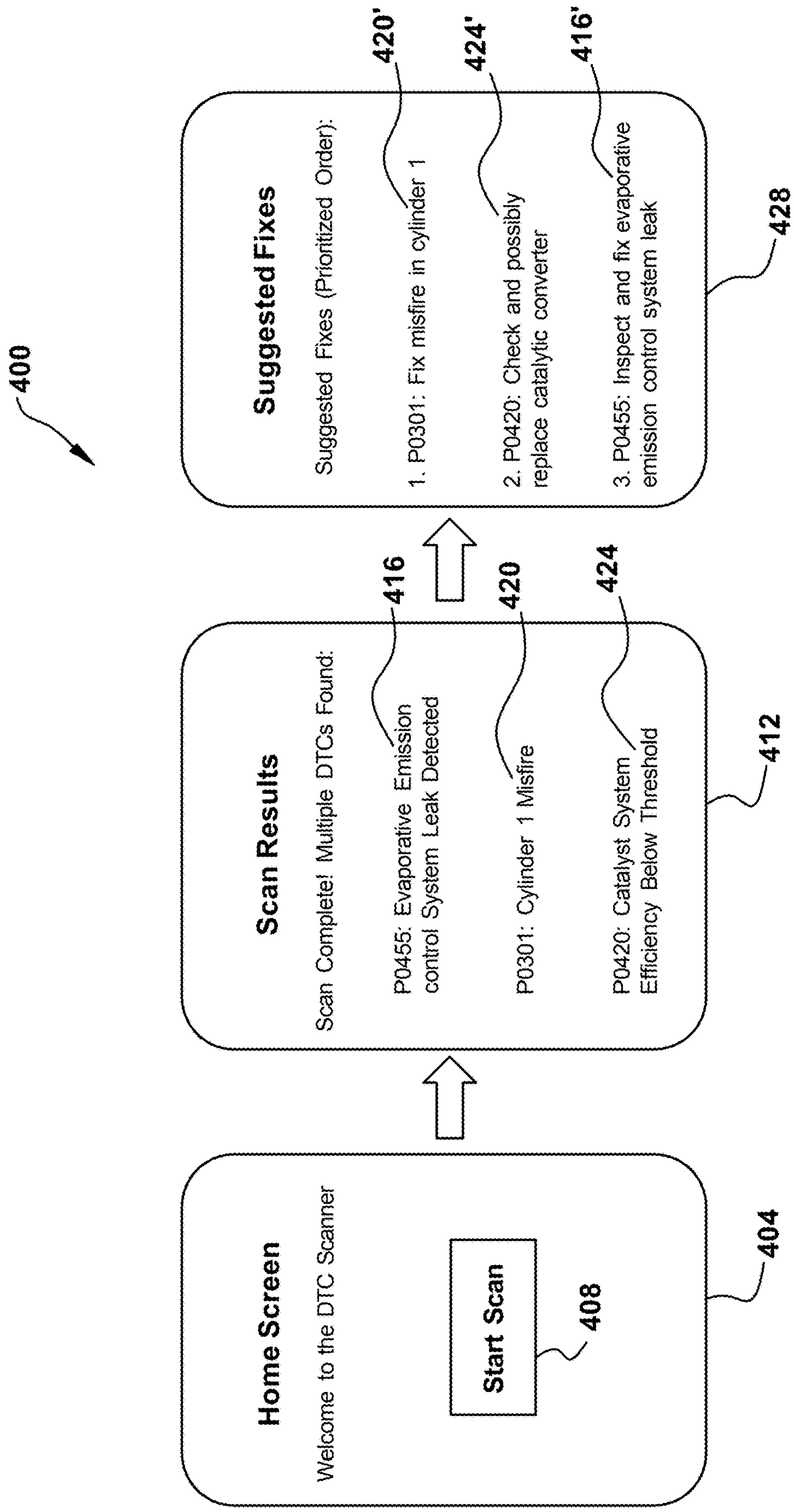
FIG. 4 illustrates an example embodiment of a user interface sequence for a touchscreen of a smart OBD scanner with automated DTC prioritization and resolution.

FIG. 4 illustrates an example embodiment of a user interface sequence 400, such as may be found on a touchscreen of a smart OBD scanner with automated DTC prioritization and resolution. A home screen 404 is generated and includes a user selectable indicia 408 to commence a vehicle scan. A scan is selected and completed, leading to screen 412 where scan results are displayed. In the illustrated example, three DTC codes were returned, and suitably listed in an order of discovery. These include P0455: Evaporative Emission Control Leak Detected (416); P0301: Cylinder 1 misfire (420); and P0420: Catalyst System Efficiency Below Threshold (424). The afore-described automated DTC prioritization is then completed leading to output screen 428. The prioritized fix order is then presented with fixes first made for 420', followed by 424' and then 416'.

While specific example has been detailed for a four level priority system above, as noted earlier, different ranges of priority levels may be accommodated in a similar example. FIG. 5 illustrates a table of representative DTC prioritization with a relatively low granularity of three priority levels.

1. Critical Priority Codes:

These codes require immediate attention as they pose significant safety risks or can cause severe damage to the vehicle if not addressed promptly. These issues often affect the vehicle's core functionalities and critical safety systems.

Examples: ECM/PCM internal faults, brake system failures, airbag system faults, and engine overheating.

2. Important Priority Codes:

These codes represent problems that significantly impact the vehicle's performance, drivability, or emissions but do not pose immediate safety risks. Addressing these issues soon is essential to prevent further damage and ensure the vehicle operates efficiently and within regulatory compliance.

Examples: Engine misfires, fuel system problems, oxygen sensor faults, and turbocharger underboost conditions.

3. Minor Priority Codes:

These codes are related to non-critical systems that primarily affect the convenience, comfort, or minor functionalities of the vehicle. While these issues do not significantly impact safety or performance, addressing them can improve the overall driving experience and prevent minor annoyances.

Examples: Climate control system faults, infotainment system issues, door ajar warning light malfunctions, and minor sensor circuit faults.

FIG. 6 illustrates the same representative DTCs of FIG. 5 with a relatively high granularity of six levels. A table of representative DTC prioritization with six levels appears above.

Figure 7:
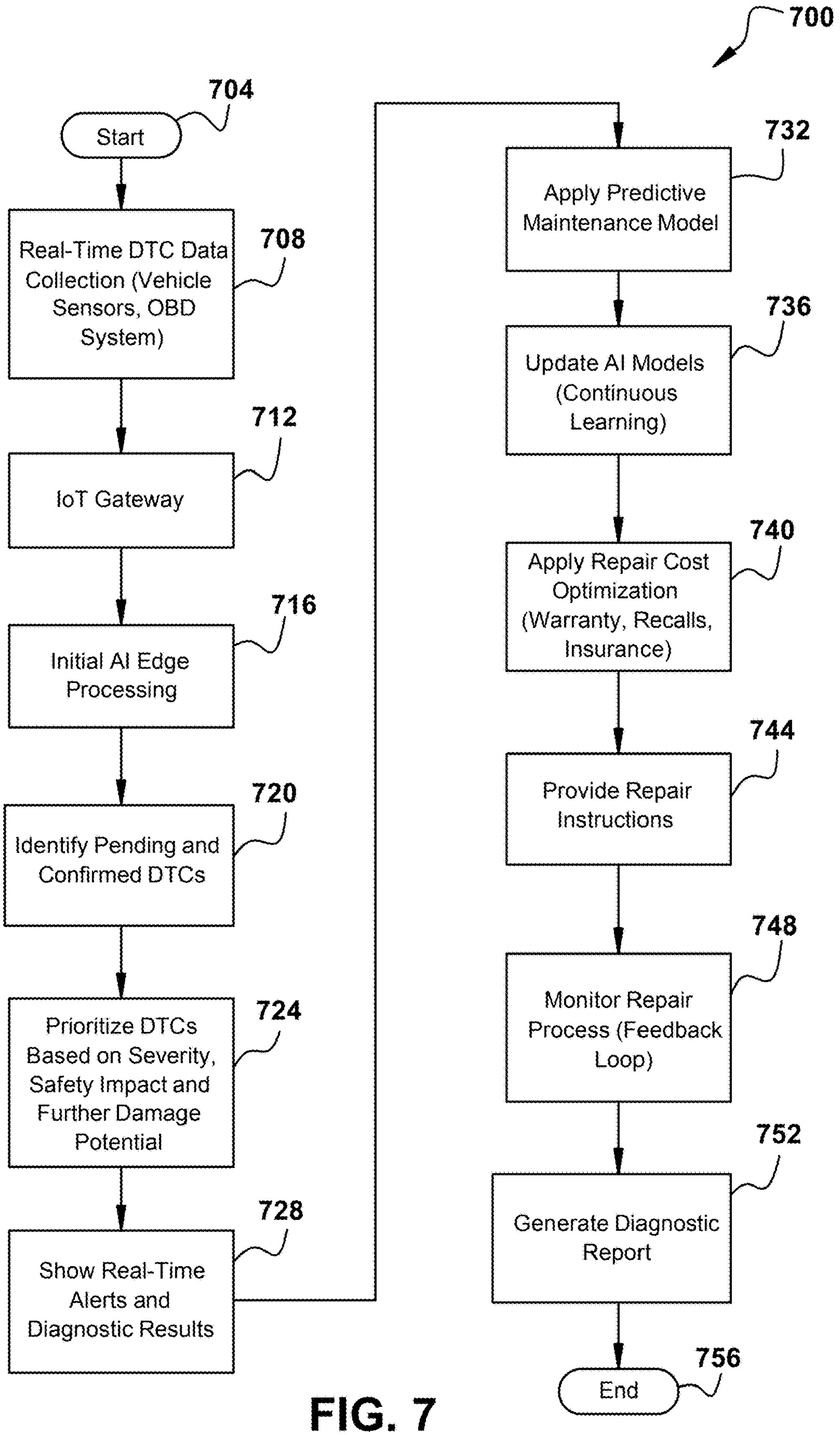
FIG. 7 illustrates a flowchart of an example embodiment of a smart OBD scanner with automated DTC prioritization and resolution that acquires real-time vehicle diagnostic data that integrates machine learning and artificial intelligence (AI).

FIG. 7 illustrates a flowchart 700 of an example embodiment of a smart OBD scanner with automated DTC prioritization and resolution that acquires real-time vehicle diagnostic data that integrates machine learning and artificial intelligence (AI). Integrating AI provides enhanced DTC prioritization, and issue resolutions based not only on current DTC codes, but also on predictive failures, further providing cost-optimized solutions based on alternative solutions, warranty coverage or insurance coverage. The system begins at block 704 and proceeds to block 708 wherein vehicle data is obtained via vehicle sensors and the OBD system, which collect real-time data on various aspects of the vehicle's performance, including engine, transmission, and emissions data. This data is then transferred via an Internet of Things (IoT) gateway at block 712, which acts as a bridge between the vehicle and the next stages of data processing. An IoT gateway prepares IoT devices for connection to the cloud, facilitating secure and efficient communication. It aggregates and processes data translating communication protocols into a standardized format, and ensuring secure data transmission with encryption and authentication. In the example AI-assisted DTC prioritization and repair system, the IoT gateway connects vehicle sensors and the OBD system to the cloud platform via an edge processor at block 716.

The edge AI device processes data locally, providing real-time analysis and initial diagnostics. This local processing capability assists in timely detection of critical issues that might require immediate attention. By handling some of the data processing on the edge, the system reduces latency and improves the responsiveness of the diagnostics.

The bulk of data processing, storage, and advanced analytics occur on a cloud platform, such as AWS, Azure, or Google Cloud, which commences at block 720. The cloud platform offers scalable computing power to handle large volumes of data from multiple vehicles. This stage involves aggregating, cleaning, and storing data, ensuring that it is ready for further analysis and machine learning model training.

Machine learning model training is a component of the system where AI models are developed and trained using collected data. These models improve diagnostic accuracy and predictive maintenance capabilities. By learning from historical data and real-time inputs, the AI model can identify patterns and predict potential issues before they become critical.

AI-assisted diagnostics utilize these trained models to analyze incoming data, prioritize DTCs at block 724. This, in turn, generates diagnostic reports and recommendations which are displayed in real time, or near real time, at block 728. This stage leverages the power of AI to provide actionable insights that help mechanics and vehicle owners address problems effectively and efficiently.

The diagnostic information and repair instructions are suitably displayed to users through a user-friendly interface and dashboard. This interface can be suitably accessed on various devices, including diagnostic tools, computers, and mobile devices, or an integrated vehicle display, making it easy for users to understand the issues and take appropriate actions quickly.

Next, a predictive maintenance model is applied at block 732, wherein prior machine learning is applied to current OBD information to determine what other vehicle issues are likely to follow. Next, AI models are updated with the OBD information and predicted issues at block 736. A continuous learning and feedback loop is integrated into the system to update the AI models based on feedback and new data. This ongoing improvement process allows the AI to enhance its diagnostic accuracy and recommendations over time. By learning from real-world repair outcomes, the system becomes more effective in identifying and prioritizing issues, ultimately leading to better vehicle maintenance and reduced downtime.

Next, at block 740, repairs are determined and cost optimized using factors such as warranty information, vehicle recalls and insurance coverage. Prioritized and optimized repair instructions are provided at block 744. The repair process is monitored at block 748, providing a feedback loop to update the AI models at block 736. A diagnostic report is generated at block 752 and the process ends at block 756.

Figure 8:
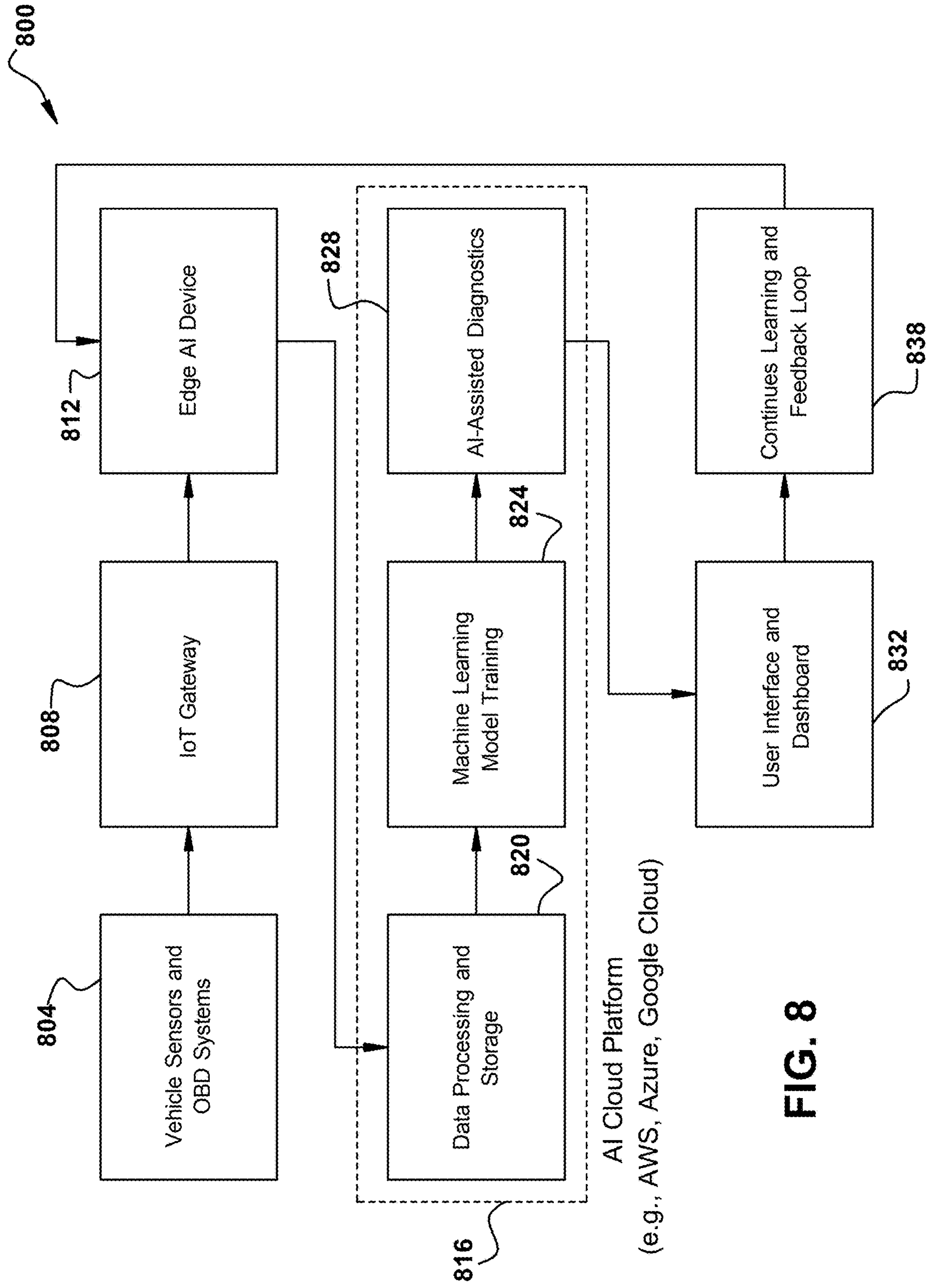
FIG. 8 illustrates an example embodiment of a hardware block diagram of a smart OBD scanner with automated DTC prioritization and resolution that acquires real-time vehicle diagnostic data that integrates machine learning and AI.

FIG. 8 illustrates an example embodiment of a hardware block diagram 800 of a smart OBD scanner with automated DTC prioritization and resolution that acquires real-time vehicle diagnostic data that integrates machine learning and artificial intelligence. Vehicle data is acquired by vehicle sensors and OBD systems at block 804. This data is relayed to IoT gateway system 808. As noted above, IoT gateway data processing includes aggregating, filtering, summarizing, and compressing vehicle data before transmitting it to the cloud. It translates different communication protocols into a common format, performs initial analyses, and reduces data volume. This local processing reduces latency, conserves bandwidth, and enhances system efficiency and responsiveness, enabling real-time decision-making and actions.

Processed data from IoT gateway 808 is relayed to edge AI device 812. The AI edge device processes data locally that it acquires from the IoT gateway, performing real-time analysis and decision-making. It aggregates, filters, and analyzes incoming data to detect anomalies, predict maintenance needs, and provide immediate feedback or actions without relying on constant cloud connectivity. This reduces latency and bandwidth usage, enhances data privacy, and ensures quick, efficient responses to critical situations. The edge device thus optimizes performance and reliability by handling crucial processing tasks close to the data source.

Data from edge AI device 812 is relayed to an AI cloud platform 816, suitable comprised of one or more cloud services, such as Amazon Web Service (AWS), Azure or Google Cloud. Cloud platform 816 includes a data processing and storage system 820 configured for data communication with edge AI device 812. Cloud platform 816 includes a machine learning and model training system 824 for processing data received into the cloud. Cloud platform 816 further includes an AI diagnostics system 828 to diagnose and provide remedies. Diagnoses and remedies are relayed from cloud 816 to user interface and dashboard system 832. Information is displayed and fed back through a looping system 838 to edge AI device 812.

It is contemplated that the DTC categorization described above may be vehicle-specific, location-specific, as well as user-specific. In this regard, certain DTC's, and their related fixes, may be may be associated with different priorities in from one vehicle to the next. For instance, DTCs associated with the vehicle's balance system (e.g., a balance bar) may be more critical in taller/narrower vehicles, than in shorter/wider vehicles. Thus, an initial step in the process may entail retrieving vehicle identification information for the vehicle under test, and then configuring the prioritization scheme based on the retrieved vehicle identification information.

The prioritization scheme may also be location-specific, wherein the prioritization scheme in one location differs from the prioritization scheme in another location. For instance, engine-temperature management systems may have higher criticality in desert locations than in other locations. Furthermore, certain diagnostic issues may be more critical at elevation than at sea level. Accordingly, an initial step in the process may entail retrieving location information associated with the vehicle under test, and then configuring the prioritization scheme based on the retrieved location information. The location information may be entered by a user during an initial registration process. It is also contemplated that the location information may be retrieved via a navigation system associated with the vehicle and retrieved in the vehicle data packet. It is further contemplated that the location information may be retrieved from a personnel electronic device (e.g., smartphone) in communication with the tool 108.

The prioritization scheme may also be selectively configured based on the preferences of the user. For instance, the user may have added enhanced components or features to the vehicle that the user would want to prioritize. It is also contemplated that the user may want to identify certain systems or functionalities as having higher priorities than others. Thus, an initial step in the process may entail receiving prioritization instructions, commands, or selections from the user and configuring the prioritization scheme accordingly. In this regard, the customized prioritization may be facilitated through an app running on the user's smartphone, which may provide a menu of a default prioritization scheme, which the user may reorganize as desired. Alternatively, the system may be configured such that the user may enter a component, system, DTC, and/or fix that the user would like to assign a particular prioritization.

It is also contemplated that in certain embodiments, the prioritization scheme may be reorganized based on trends in the diagnostic data. The trends may be specific to the vehicle under test, or based on data from similarly situated vehicles. For instance, if it is known that vehicles that are the same year, make, model and engine as the vehicle under test have encountered a particular fix at a high frequency, that fix and/or the associated DTCs or vehicle components may be moved to a higher priority. This change in prioritization may be implemented at the data center 120 based on algorithms or AI monitoring fixes over a wide geographic area. In general, as the frequency of a particular fix increases, the likelihood of the fix being assigned a higher priority may increase, and vice versa.

As discussed above, various aspects of the present disclosure entail retrieval and analysis of vehicle data. For more information regarding the retrieval and analysis of vehicle data, including DTCs, please refer the following U.S patents and published patent applications, owned by Innova Electronic Corporation, which is also the owner of the present disclosure: U.S. Pat. No. 6,807,469, entitled AUTO DIAGNOSTIC METHOD AND DEVICE, U.S. Pat. No. 6,925,368, entitled AUTO DIAGNOSTIC METHOD AND DEVICE, U.S. Pat. No. 7,620,484, entitled AUTOMOTIVE MOBILE DIAGNOSTICS, U.S. Pat. No. 8,019,503, entitled AUTOMOTIVE DIAGNOSTIC AND REMEDIAL PROCESS, U.S. Pat. No. 8,370,018, entitled AUTOMOTIVE DIAGNOSTIC PROCESS, U.S. Pat. No. 8,909,416, entitled HANDHELD SCAN TOOL WITH FIED SOLUTION CAPABILITY, U.S. Pat. No. 9,026,400, entitled DIAGNOSTIC PROCESS FOR HOME ELECTRONIC DEVICES, U.S. Pat. No. 9,177,428, entitled PREDICTIVE DIAGNOSTIC METHOD, U.S. Pat. No. 9,646,432, entitled HAND HELD DATA RETRIEVAL DEVICE WITH FIXED SOLUTION CAPABILITY, U.S. Pat. No. 10,643,403, entitled PREDICTIVE DIAGNOSTIC METHOD AND SYSTEM, U.S. Pat. No. 11,068,560, entitled METHOD OF PROCESSING VEHICLE DIAGNOSTIC DATA, U.S. Pat. No. 11,270,529, entitled SYSTEM AND METHOD FOR PROACTIVE VEHICLE DIAGNOSIS AND OPERATIONAL ALERT, U.S. Pat. No. 11,158,141, entitled SYSTEM AND METHOD FOR PROACTIVE VEHICLE DIAGNOSIS AND OPERATIONAL ALERT, U.S. Pat. No. 12,112,587 entitled SYSTEM AND METHOD FOR GUIDED VEHICLE DIAGNOSTICS, U.S. Pat. No. 11,915,534 entitled VEHICLE DIAGNOSTICS WITH INTELLIGENT COMMUNICATION INTERFACE, U.S. Pat. No. 11,625,962, entitled SYSTEM, METHOD, AND COMPUTER PROGRAM PRODUCT FOR PROVIDING APPLICATION-BASED ASSISTANCE WITH VEHICLE EMISSION TEST COMPLIANCE, the entire contents of each of which is expressly incorporated herein by reference.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An On-Board Diagnostics scanner with automated diagnostic trouble code (DTC) prioritization and resolution comprising:

a processor;

memory, wherein the memory includes software that provides automated DTC prioritization and resolution;

a data interface configured to receive DTC output from an associated vehicle on-board diagnostic port;

a diagnostic connector configured to place the scanner in data communication with the associated vehicle when plugged into its DLC port; and a user interface including a user input and a display;

wherein the processor is configured to:

receive, via the data interface, the DTC output from the associated vehicle on-board diagnostic port;

identify, from the DTC output, one or more confirmed DTCs and one or more pending DTCs;

for each confirmed DTC, determine whether the one or more pending DTCs include a pending DTC having a same DTC code as the confirmed DTC;

wherein, when the one or more pending DTCs include the pending DTC having the same DTC code as the confirmed DTC, the processor is further configured to classify the confirmed DTC as an active DTC to mitigate false-positive repair indications associated with confirmed DTCs for which a corresponding pending DTC is absent; and wherein the processor is further configured to show a fix for the active DTC on the display.

2. The On-Board Diagnostics scanner with automated DTC prioritization and resolution of claim 1 wherein DTC codes are stored with an associated priority level, and, when the processor determines that there are multiple active DTCs, the processor is further configured to display fixes for each active DTC, wherein the fixes are ordered from DTCs with a higher priority level to DTCs with a lower priority level.

3. The On-Board Diagnostics scanner with automated DTC prioritization and resolution of claim 2, wherein the associated priority levels associated with the DTCs are vehicle specific.

4. The On-Board Diagnostics scanner with automated DTC prioritization and resolution of claim 2, wherein the associated priority levels associated with the DTCs are at least in part based on location.

5. The On-Board Diagnostics scanner with automated DTC prioritization and resolution of claim 2 wherein groups of DTCs share one of a plurality of priority levels, and wherein the processor is further configured to sequentially:

show fixes for all active DTCs in a highest priority level group, show fixes for all active DTCs in one or more intermediate priority level groups, and show fixes for all active DTCs in a lowest priority level group.

6. The On-Board Diagnostics scanner with automated DTC prioritization and resolution of claim 5 wherein the highest priority level group comprises DTCs associated with a vehicle electronic control module, a high intermediate priority level group includes DTCs associated with system or ignition voltage, a low intermediate priority group includes DTCs associated with circuits or sensors, and a lowest priority level group includes DTCs not assigned to any other group.

7. The On-Board Diagnostics scanner with automated DTC prioritization and resolution of claim 5, wherein the highest priority level group comprises ECM memory DTCs, a high intermediate priority level group comprises System and Ignition voltage DTCs, a low intermediate priority level group comprises Component/circuit DTCs, and the lowest priority level group comprises System DTCs, and wherein, within each priority level group, the processor is configured to show fixes for active DTCs from a lowest DTC number to a highest DTC number.

8. The On-Board Diagnostics scanner with automated DTC prioritization and resolution of claim 1, wherein the steps implemented at the processor proceed autonomously in response to receipt of the DTC output.

9. The On-Board Diagnostics scanner with automated DTC prioritization and resolution of claim 1, wherein the processor is configured to perform the determining whether the one or more pending DTCs include a pending DTC having a same DTC code as the confirmed DTC in response to a malfunction indicator lamp (MIL) being illuminated, and wherein the processor is configured to classify the received DTC as an inactive DTC when the received DTC is unconfirmed and there are no other pending DTCs.

10. A method for automated diagnostic trouble code DTC prioritization and resolution comprising:

receiving, into memory, DTC output from an associated vehicle on-board diagnostic port;

identifying, via a processor from the DTC output, one or more confirmed DTCs and one or more pending DTCs;

for each confirmed DTC, determining, via the processor, whether the one or more pending DTCs include a pending DTC having a same DTC code as the confirmed DTC;

when the one or more pending DTCs include the pending DTC having the same DTC code as the confirmed DTC, classifying, via the processor, the confirmed DTC as an active DTC to mitigate false-positive repair indications associated with confirmed DTCs for which a corresponding pending DTC is absent; and showing a fix for the active DTC on a display.

11. The method for automated diagnostic trouble code DTC prioritization and resolution of claim 10 wherein DTC codes are stored with an associated priority level, and, when the processor determines that there are multiple active DTCs, further comprising showing fixes for each active DTC, wherein the fixes are ordered from DTCs with a higher priority level to DTCs with a lower priority level on the display.

12. The method for automated diagnostic trouble code DTC prioritization and resolution of claim 11 wherein groups of DTCs share one of a plurality of priority levels, and further comprising generating an ordered showing on the display of:

fixes for all active DTCs in a highest priority level group;

fixes for all active DTCs in one or more intermediate priority level groups; and fixes for all active DTCs in a lowest priority level group.

13. The method for automated diagnostic trouble code DTC prioritization and resolution of claim 12 wherein the highest priority level group comprises DTCs associated with a vehicle electronic control module, a high intermediate priority level group includes DTCs associated with system or ignition voltage, a low intermediate priority group includes DTCs associated with circuits or sensors, and a lowest priority level group includes DTCs not assigned to any other group.

14. The method for automated diagnostic trouble code DTC prioritization and resolution of claim 12 having four priority level groups:

a critical priority group of DTCs associated with vehicle electronic control module issues or safety risks;

a high priority group of DTCs associated with vehicle performance, drivability or emissions;

a medium priority group of DTCs associated with vehicle drivability, fuel efficiency or minor safety systems; and a low priority group of DTCs associated with convenience or comfort for vehicle occupants.

15. A computer program product comprising one or more non-transitory program storage media on which are stored instructions executable by a processor or programmable circuit to perform operations for supporting vehicle diagnostics, the operations comprising:

retrieving one or more diagnostic trouble codes (DTCs) from a vehicle, the retrieved diagnostic codes including at least one confirmed DTC;

for each confirmed DTC from among the one or more DTCs retrieved from the vehicle, checking whether the one or more DTCs include a pending DTC that matches the confirmed DTC; and for each confirmed DTC from among the one or more DTCs retrieved from the vehicle, assigning a repair priority to the confirmed DTC based on a result of the checking;

when the one or more DTCs include the pending DTC having the same DTC code as the confirmed DTC, classifying the confirmed DTC as an active DTC to distinguish the active DTC from an inactive confirmed DTC for which a corresponding pending DTC is absent; and causing a display to show a fix for the active DTC based on the repair priority.

16. The computer program product of claim 15, wherein the assigning the repair priority based on the result of the checking gives higher priority to confirmed DTCs for which there is a pending DTC that matches the confirmed DTC.

17. The computer program product of claim 15, wherein the assigning the repair priority to the confirmed DTC is further based on a membership of the confirmed DTC in one of a plurality of priority groupings of DTCs.

18. The computer program product of claim 17, wherein the assigning the repair priority based on the membership gives higher priority to DTCs related to an electronic control module (ECM) of the vehicle than to DTCs related to system and ignition voltage.

19. The computer program product of claim 17, wherein the assigning the repair priority based on the membership gives higher priority to DTCs related to an electronic control module (ECM) of the vehicle than to DTCs related to components or circuits.

20. The computer program product of claim 17, wherein the assigning the repair priority based on the membership gives higher priority to DTCs related to an electronic control module (ECM) of the vehicle than to DTCs related to system.

21. The computer program product of claim 17, wherein the assigning the repair priority based on the membership gives higher priority to DTCs related to system and ignition voltage than to DTCs related to components or circuits.

22. The computer program product of claim 17, wherein the assigning the repair priority based on the membership gives higher priority to DTCs related to system issues and ignition voltage than to DTCs related to system issues.

23. The computer program product of claim 17, wherein the assigning the repair priority based on the membership gives higher priority to DTCs related to components or circuits than to DTCs related to system.

24. The computer program product of claim 17, wherein the assigning the repair priority to the confirmed DTC is further based on a numbering of the DTC.

25. The computer program product of claim 24, wherein the assigning the repair priority based on the numbering gives higher priority to lower numbered DTCs having the same priority grouping membership.

* * * * *